United States Patent
Ge et al.

(10) Patent No.: US 8,335,520 B2
(45) Date of Patent: Dec. 18, 2012

(54) MOBILE PHONE AND LOCATION UPDATE METHOD THEREOF

(75) Inventors: Chi-Sheng Ge, Taipei Hsien (TW); Chen-Huang Fan, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 435 days.

(21) Appl. No.: 12/727,248

(22) Filed: Mar. 19, 2010

(65) Prior Publication Data
US 2011/0111768 A1 May 12, 2011

(30) Foreign Application Priority Data
Nov. 6, 2009 (CN) .......................... 2009 1 0309404

(51) Int. Cl.
*H04W 24/00* (2009.01)
(52) U.S. Cl. ................ 455/456.1; 455/422.1; 455/432.1
(58) Field of Classification Search ....... 455/432.1–445, 455/456.1–456.6; 370/331–338
See application file for complete search history.

(56) References Cited

U.S. PATENT DOCUMENTS

| | | | |
|---|---|---|---|
| 7,929,497 B1* | 4/2011 | Alasti et al. | 370/331 |
| 2005/0143061 A1* | 6/2005 | Hossain et al. | 455/422.1 |
| 2007/0133469 A1* | 6/2007 | Shin et al. | 370/331 |
| 2010/0142486 A1* | 6/2010 | Wahlqvist et al. | 370/332 |

* cited by examiner

*Primary Examiner* — Kamran Afshar
*Assistant Examiner* — Kashif Siddiqui
(74) *Attorney, Agent, or Firm* — Altis Law Group, Inc.

(57) ABSTRACT

A mobile phone and a location update method adapted for the mobile phone are provided. The mobile phone includes a location update processing unit, a location area judging unit, a scope acquiring unit, a scope judging unit, and a selecting unit. When the mobile phone frequently moves back and forth within a predetermined scope of a boundary area of two adjacent location areas, the mobile phone does not perform a location update, and thus the mobile phone does not need send updated location information to a network server and saves a lot of power.

8 Claims, 4 Drawing Sheets

MOBILE PHONE AND LOCATION UPDATE METHOD THEREOF

BACKGROUND

1. Technical Field

The disclosure relates to wireless communication technologies and, more particularly, to a mobile phone and a location update method adapted for a mobile phone.

2. Description of Related Art

In a communication system, a location area (LA) includes a plurality of cells and has an identification code (ID). All cells in the location area share the same LA ID. When a mobile phone frequently moves between two adjacent cells belonging to two adjacent location areas, the mobile phone frequently switches between the two adjacent location areas and thus frequently performs a location update. However, frequent location updates waste a lot of power of the mobile phone.

BRIEF DESCRIPTION OF THE DRAWINGS

The components in the drawings are not necessarily drawn to scale, the emphasis instead being placed upon clearly illustrating the principles of the mobile phone. Moreover, in the drawings, like reference numerals designate corresponding parts throughout the several views.

DETAILED DESCRIPTION

Figure 1:
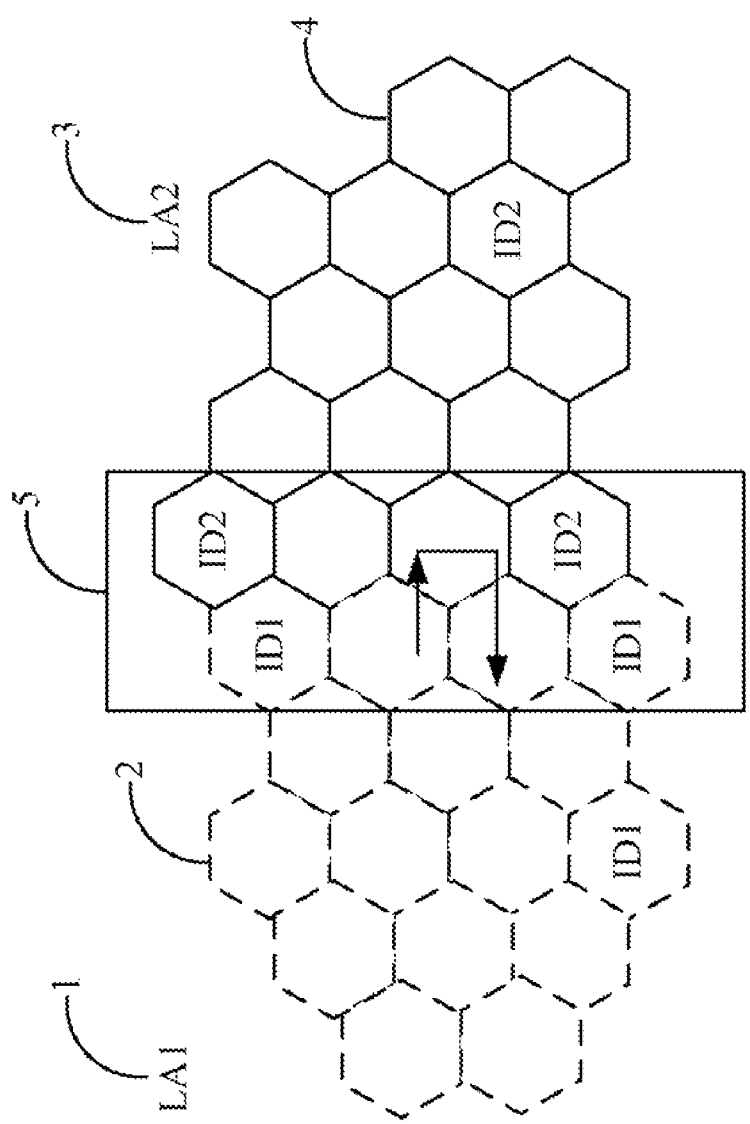
FIG. 1 is a location schematic view of a hardware infrastructure of a mobile network in accordance with an embodiment.

FIG. 1 is a location schematic view of a mobile network in accordance with an embodiment. A first location area 1 (LA1) is assigned an identification code ID1, and includes a plurality of cells 2, marked with broken line of FIG. 1. The plurality of cells 2 share the identification code of the LA1, and an identification code of each of the cells 2 is marked with LA1 ID1. A second location area 3 (LA2) is assigned an identification code ID2, and includes a plurality of cells 4, marked with real line of FIG. 1. The plurality of cells 4 share the identification code of the LA2, and an identification code of each of the cells 4 is marked with LA2 ID2. There is a boundary area 5 between two adjacent location areas. For example, as that shown in FIG. 1, the boundary area 5 is an area that is circled by a rectangle and includes cells some of which belong to the first location area LA1 and some of which belong to the second location area LA2.

Figure 3:
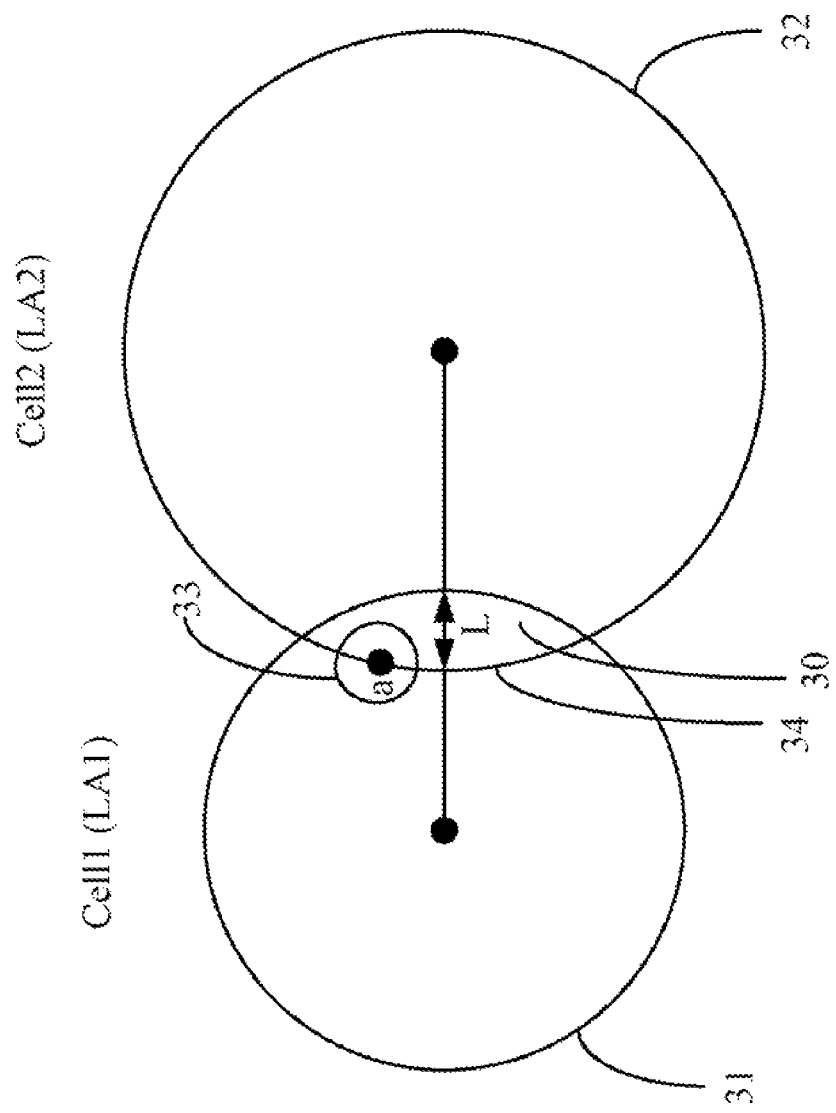
FIG. 3 is a schematic view of the mobile phone of FIG. 2 defining a predetermined scope.

Referring to FIG. 3, a cell 1 belongs to the LA1, a cell 2 belongs to the LA2, and the cell 1 and the cell 2 are two adjacent cells of the boundary area 5. A first coverage area 31 of the cell 1 is a first circle of an "r1" radius, and a second coverage area 32 of the cell 2 is a second circle of an "r2" radius. There is an overlapping area 30 between the two adjacent cells 31 and 32.

Figure 2:
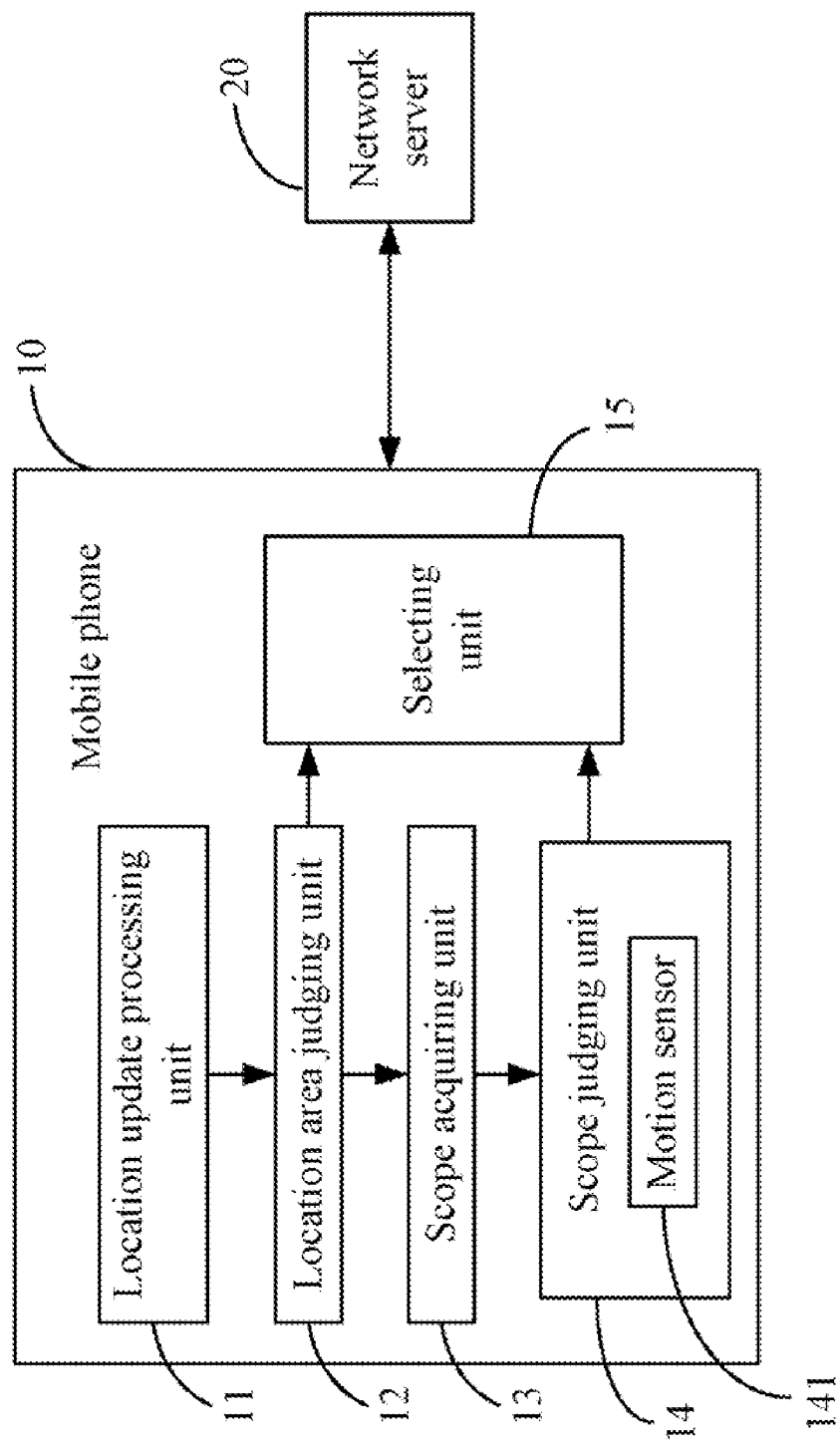
FIG. 2 is a block diagram of a mobile phone in accordance with an embodiment.

FIG. 2 is a block diagram of a hardware infrastructure of a mobile phone in accordance with an embodiment. A network server 20 provides communication services for the mobile phone 10. The mobile phone 10 includes a location update processing unit 11, a location area judging unit 12, a scope acquiring unit 13, a scope judging unit 14, and a selecting unit 15. The location update processing unit 11 is configured for generating a first control signal when identifying that the mobile phone 10 frequently performs location updates in a predetermined time. The location area judging unit 12 is configured for judging whether the mobile phone 10 frequently moves back and forth near a boundary 34 of an overlapping area 30 of two adjacent cells of the boundary area 5 in response to the first control signal.

When the mobile phone 10 seldom moves back and forth near the boundary 34 of the overlapping area 30, the location area judging unit 12 generates a second control signal, and the selecting unit 15 controls the mobile phone 10 to perform a location update in response to the second control signal and sends the updated location information to the network server 20.

When the mobile phone 10 frequently moves back and forth near the boundary 34 of the overlapping area 30, the location area judging unit 12 generates a third control signal and the scope acquiring unit 13 acquires a predetermined scope near the boundary 34 of the overlapping area 30 in response to the third control signal.

As shown in FIG. 3, the predetermined scope 33 is a circle of an "r" radius and the center of the circle is on the boundary 34 of the overlapping area 30. For example, when the mobile phone 10 frequently moves back and forth near the boundary "a" of the overlapping area 30, the predetermined scope 33 is a circle of the center of "a" and the "r" radius which is equal to one half of a distance between the center of the cell 1 and the center of the cell 2 subtracted from the sum of the radius of the cell 1 and the radius of the cell 2, that is, $r=\{r1+r2-(r1+r2-L)\}/2=L/2$, wherein, "L" represents a distance between the boundary of the cell 1 and the boundary of the cell 2 on the line between the center of the cell 1 and the center of the cell 2.

The scope judging unit 14 is configured for judging whether the mobile phone 10 moves out the predetermined scope 33 in the course of frequent motions. The scope judging unit 14 may be a motion sensor 141. When the mobile phone 10 moves, the motion sensor 141 periodically calculates a distance between the mobile phone 10 and the center of the predetermined scope 33 and judges whether the distance is greater than the "r" radius of the predetermined scope 33. When the motion sensor 141 judges that the distance is greater than the "r" radius, the scope judging unit 14 judges that the mobile phone 10 moves out the predetermined scope 33. When the motion sensor 141 judges that the distance is equal to or less than the "r" radius, the scope judging unit 14 judges that the mobile phone 10 moves within the predetermined scope 33. In the predetermined scope 33, signal intensity of the mobile phone 10 is still enough to support the communications between the mobile phone 10 and the network server 20, thus, the mobile phone 10 does not perform a location update.

When the scope judging unit 14 judges that the mobile phone 10 moves out the predetermined scope 33 but still can receives wireless signals from the two adjacent cell 1 and cell 2 namely the mobile phone 10 is near the overlapping area 30, the selecting unit 15 compares with the signal intensities of the current cell and the other adjacent cell to get a compared value and judges whether the compared value is greater than a predetermined value. When the selecting unit 15 judges that the compared value is greater than the predetermined value, the selecting unit 15 controls the mobile phone 10 to switch from the current cell to the other cell and perform a location update and sends the updated location information to the network server 20, and thus the network server 20 can duly acquires the accurate location information of the mobile phone 10 and insures the communication quantity with the mobile phone 10. When the compared value is equal to or less than the predetermined value, the mobile phone 10 remains in the current cell and does not perform a location update.

Figure 4:
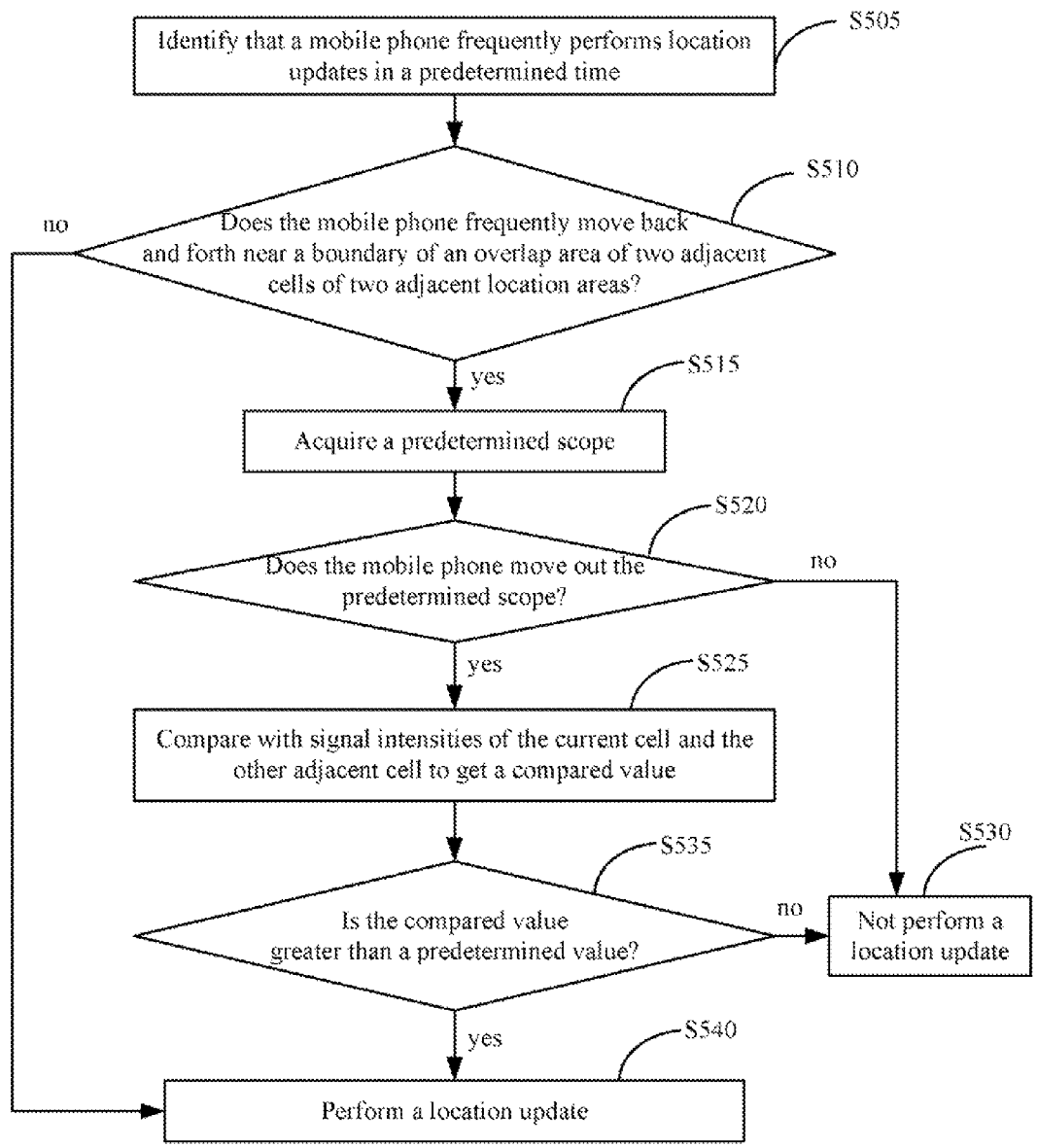
FIG. 4 is a flowchart of a location update method adapted for the mobile phone of FIG. 2, in accordance with an embodiment.

FIG. 4 is a flowchart of a location update method adapted for the mobile phone of FIG. 2, in accordance with an embodiment. In step S505, the location update processing unit 11 generates the first control signal when identifying that the mobile phone 10 frequently performs location updates in the predetermined time. In step S510, the location area judging unit 12 judges whether the mobile phone 10 frequently moves back and forth near the boundary 34 of the overlapping area of two adjacent cells in response to the first control signal. If the mobile phone 10 seldom moves back and forth near the boundary 34 of the overlapping area 30, in step S540, the location area judging unit 12 generates the second control signal and the selecting unit 15 controls the mobile phone 10 to perform a location update in response to the second control signal.

If the mobile phone 10 frequently moves back and forth near the boundary 34 of the overlapping area 30, in step S515, the location area judging unit 12 generates the third control signal and the scope acquiring unit 13 acquires the predetermined scope 33 near the boundary 34 of the overlapping area 30 in response to the third control signal, and the predetermined scope 33 is the circle of the center of on the boundary 34 and the "L/2" radius. In step S520, the scope judging unit 14 judges whether the mobile phone 10 moves out the predetermined scope 33 in the course of frequent motions. If the mobile phone 10 moves within the predetermined scope 33, in step S530, the mobile phone 10 does not perform a location update.

In step S525, the selecting unit 15 compares with the signal intensities of the current cell and the other adjacent cell to get the compared value. If the mobile phone 10 moves out the predetermined scope 33, in step S535, the selecting unit 15 judges whether the compared value is greater than the predetermined value. If no, the procedure turns to the step S530, the mobile phone 10 does not perform a location update. If yes, the procedure turns to the step S540, the mobile phone 10 performs a location update.

Therefore, when the mobile phone 10 frequently moves back and forth within the predetermined scope of the boundary area 5 of the two adjacent location areas, the mobile phone 10 does not perform location update actions, and thus the mobile phone 10 does not need send updated location information to the network server 20 and saves a lot of power.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A mobile phone comprising:

a location update processing unit for generating a control signal when identifying that the mobile phone frequently performs location updates in a predetermined time;

a location area judging unit for judging whether the mobile phone frequently moves back and forth near a boundary of an overlapping area of two adjacent cells of the boundary area of two adjacent location areas in response to the control signal;

a scope acquiring unit for acquiring a predetermined scope when the mobile phone frequently moves back and forth near the boundary of the overlapping area, wherein the predetermined scope is a circle, the center of the circle is on the boundary of the overlapping area, and the radius of the circle is equal to one half of a distance between the center of one cell and the center of the other adjacent cell subtracted from the sum of the radius of the cell and the radius of the other cell;

a scope judging unit for judging whether the mobile phone moves out the predetermined scope when the mobile phone frequently moves back and forth near the boundary of the overlapping area; and a selecting unit for controlling the mobile phone to perform a location update when the mobile phone moves out the predetermined scope;

wherein when the mobile phone does not move out the predetermined scope, the mobile phone does not perform a location update.

2. The mobile phone as recited in claim 1, wherein the scope judging unit is a motion sensor for periodically calculating a distance between the mobile phone and the center of the predetermined scope and judging whether the distance is greater than the radius of the predetermined scope.

3. The mobile phone as recited in claim 2, wherein when the motion sensor calculates that the distance is greater than the radius of the predetermined scope, the mobile phone moves out the predetermined scope; and when the motion sensor calculates that the distance is equal to or less than the radius of the predetermined scope, the mobile phone moves within the predetermined scope.

4. The mobile phone as recited in claim 1, wherein the selecting unit is further configured for comparing with signal intensities of the current cell of the mobile phone and the other adjacent cell to get a compared value and judging whether the compared value is greater than a predetermined value when the mobile phone moves out the predetermined scope, when the compared value is greater than the predetermined value, the selecting unit controls the mobile phone to perform a location update; and when the compared value is equal to or less than the predetermined value, the mobile phone does not perform a location update.

5. A location update method adapted for a mobile phone comprising:

identifying that the mobile phone frequently performs location update a in a predetermined time;

judging whether the mobile phone frequently moves back and forth near a boundary of an overlapping area of two adjacent cells of the boundary area of two adjacent location areas;

if the mobile phone frequently moves back and forth near the boundary of the overlapping area, acquiring a predetermined scope, wherein the predetermined scope is a circle, the center of the circle is on the boundary of the overlapping area, and the radius of the circle is equal to one half of a distance between the center of one cell and the center of the other adjacent cell subtracted from the sum of the radius of the cell and the radius of the other cell;

judging whether the mobile phone moves out the predetermined scope;

if the mobile phone moves out the predetermined scope, performing a location update; and if the mobile phone moves within the predetermined scope, not performing a location update.

6. The location update method as recited in claim 5, further comprising:

if the mobile phone seldom moves back and forth near the boundary of the overlapping area, performing a location update.

7. The location update method as recited in claim 5, the step of "judging whether the mobile phone moves out the predetermined scope" further comprising:
periodically calculating a distance between the mobile phone and the center of the predetermined scope;
judging whether the distance is greater than the radius of the predetermined scope;
if the distance is greater than the radius of the predetermined scope, judging that the mobile phone moves out the predetermined scope; and
if the distance is equal to or less than the radius of the predetermined scope, judging that the mobile phone moves within the predetermined scope.

8. The location update method as recited in claim 5, the step of "if the mobile phone moves out the predetermined scope, performing location update" further comprising:
comparing with signal intensities of the current cell of the mobile phone and the other adjacent cell to get a compared value;
judging whether the compared value is greater than a predetermined value;
if the compared value is greater than a predetermined value, performing a location update; and
if the compared value is equal to or less than the predetermined value, not performing a location update.

* * * * *